US011292925B2

(12) United States Patent
Hong et al.

(10) Patent No.: US 11,292,925 B2
(45) Date of Patent: Apr. 5, 2022

(54) FLEXIBLE NANO COATING WITH SIGNIFICANTLY ENHANCED ELECTRICAL, THERMAL AND SEMICONDUCTOR PROPERTIES

(71) Applicant: South Dakota Board of Regents, Pierre, SD (US)

(72) Inventors: Haiping Hong, Rapid City, SD (US); Christian Widener, Rapid City, SD (US); Gregory Lee Christensen, Rapid City, SD (US)

(73) Assignee: SOUTH DAKOTA BOARD OF REGENTS, Pierre, SD (US)

( * ) Notice: Subject to any disclaimer, the term of this patent is extended or adjusted under 35 U.S.C. 154(b) by 0 days.

(21) Appl. No.: 16/381,861

(22) Filed: Apr. 11, 2019

(65) Prior Publication Data

US 2019/0315975 A1 Oct. 17, 2019

Related U.S. Application Data

(60) Provisional application No. 62/656,773, filed on Apr. 12, 2018.

(51) Int. Cl.

| | |
|---|---|
| ***C09D 5/24*** | (2006.01) |
| ***C09D 133/02*** | (2006.01) |
| ***C09D 163/00*** | (2006.01) |
| ***C09D 7/61*** | (2018.01) |
| ***C09D 175/04*** | (2006.01) |
| *C08K 3/04* | (2006.01) |
| *C08K 3/38* | (2006.01) |

(52) U.S. Cl.
CPC ................. *C09D 5/24* (2013.01); *C09D 7/61* (2018.01); *C09D 133/02* (2013.01); *C09D 163/00* (2013.01); *C09D 175/04* (2013.01); *C08K 3/04* (2013.01); *C08K 3/38* (2013.01); *C08K 2201/001* (2013.01)

(58) Field of Classification Search
CPC ........................................................ C09D 5/24
See application file for complete search history.

(56) References Cited

U.S. PATENT DOCUMENTS

| | | | | |
|---|---|---|---|---|
| 5,498,372 | A | 3/1996 | Hedges | |
| 6,132,645 | A | 10/2000 | Hedges | |
| 7,871,533 | B1 * | 1/2011 | Haiping | B82Y 30/00 252/70 |
| 8,222,190 | B2 | 7/2012 | Zhamu et al. | |
| 2011/0014356 | A1 | 1/2011 | Fornes et al. | |
| 2013/0165353 | A1 * | 6/2013 | Mazyar | B82Y 30/00 507/219 |
| 2016/0115413 | A1 | 4/2016 | Hasegawa et al. | |
| 2016/0369197 | A1 | 12/2016 | Erdemir et al. | |
| 2018/0199461 | A1 * | 7/2018 | Huss | H05K 7/2039 |

* cited by examiner

*Primary Examiner* — William D Young
(74) *Attorney, Agent, or Firm* — McKee, Voorhees & Sease, PLC

(57) ABSTRACT

Disclosed herein is a conductive coating composition that includes a functionalized carbon nanomaterial and/or boron nanomaterial and a fluid component. The nanomaterial and fluid component forms hydrogen bond network in the disclosed composition. Because of the formed hydrogen bonds, the disclosed coating exhibits enhanced thermal or electrical conductivity. Also disclosed is a method to improve thermal or electrical conductivity of an existing coating composition.

15 Claims, 1 Drawing Sheet

FLEXIBLE NANO COATING WITH SIGNIFICANTLY ENHANCED ELECTRICAL, THERMAL AND SEMICONDUCTOR PROPERTIES

CROSS-REFERENCE TO RELATED APPLICATION

This application claims priority under 35 U.S.C. § 119 to U.S. Ser. No. 62/656,773, filed Apr. 12, 2018, which is incorporated herein by reference in its entirety.

This application is related to U.S. patent application Ser. No. 62/656,725, entitled "CONDUCTIVE GREASE WITH ENHANCED THERMAL OR ELECTRICAL CONDUCTIVITY AND REDUCED AMOUNT OF CARBON PARTICLE LOADING," and U.S. patent application Ser. No. 16/381,798 entitled "CONDUCTIVE GREASE WITH ENHANCED THERMAL OR ELECTRICAL CONDUCTIVITY AND REDUCED AMOUNT OF CARBON PARTICLE LOADING"; the entire contents of these patent applications are hereby expressly incorporated herein by reference including, without limitation, the specification, claims, and abstract, as well as any figures, tables, or drawings thereof.

FIELD OF THE INVENTION

The invention relates to flexible coating compositions and methods of preparing and using the same. In particular, flexible coating compositions are stable and have enhanced electrical, thermal, and/or semiconductor properties.

BACKGROUND OF THE INVENTION

There is an increasing interest in the development of conductive coatings. Conductive coatings have a wide variety of applicability. For example, conductive coatings can be used for lightening shielding in aircraft or to prevent the buildup of a static charge on containers handling explosive materials. Others have sought to address these issues. For example, U.S. Pat. No. 5,498,372 to Winston L. Hedges disclosed an electrically conductive polymeric composition for coating volatile chemical containers. However, Hedges' disclosure suffered from problems with the components agglomerating. U.S. Published Patent Application Number 2011/0014356 to Fornes et al. provides another example disclosing a complex layered material for covering a substrate to protect from lightning strikes. However, this material contains twelve layers of varying materials, including multiple layers of carbon plies. Not only is the material complex to prepare, but expensive in terms of time and components. With this in mind, there is need for improved conductive coating materials.

Accordingly, it is an objective of the present disclosure to provide conductive coating materials with enhanced electrical, thermal, and/or semiconducting properties.

A further object of the invention is to provide conductive coating materials that are flexible and can be employed to a variety of surfaces.

Other objects, advantages and features of the present invention will become apparent from the following specification taken in conjunction with the accompanying figures.

Figure 1A:
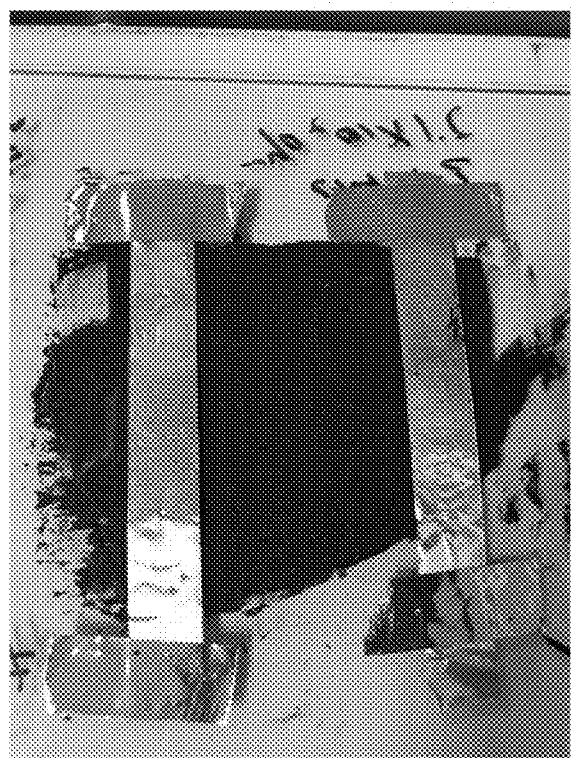
FIG. 1A is a photograph of an exemplary conductive flexible coating composition comprising carbon nanomaterial and providing enhanced conductor/semiconductor properties on a surface.

While multiple embodiments are disclosed, still other embodiments of the present invention will become apparent to those skilled in the art from the following detailed description, which shows and describes illustrative embodiments of the invention. Accordingly, the figures and detailed description are to be regarded as illustrative in nature and not restrictive. Figures represented herein are not limitations to the various embodiments according to the invention and are presented for exemplary illustration of the invention.

DETAILED DESCRIPTION OF THE PREFERRED EMBODIMENT

The present invention relates to conductive coating compositions comprising a fluid capable of hydrogen bonding and a nanomaterial. The conductive coatings have many advantages over existing conductive coatings. For example, the conductive coatings have significantly enhanced electrical, thermal, and/or semiconducting properties. Furthermore, the conductive coating compositions are flexible and can be applied to a variety of surfaces.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below. Moreover, the embodiments of this invention are not limited to particular electrical conductive coating applications, which can vary and are understood by skilled artisans. It is further to be understood that all terminology used herein is for the purpose of describing particular embodiments only and is not intended to be limiting in any manner or scope.

As used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

The term "about," as used herein, refers to variation in the numerical quantity that can occur, for example, through typical measuring techniques and equipment, with respect to any quantifiable variable, including, but not limited to, mass, volume, time, distance, wave length, frequency, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The methods and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The term "polyol ester" refers to an ester of an organic compound containing at least two hydroxyls with at least one carboxylic acid.

The term "surfactant" refers to a molecule having surface activity, including wetting agents, dispersants, emulsifiers, detergents, and foaming agents, and the like. It is understood to be inclusive of the use of a single surfactant or multiple surfactants.

The term "water miscible" as used herein, means that the component (e.g., solvent) is soluble or dispersible in water at about 20° C. at a concentration greater than about 0.2 g/L, preferably at about 1 g/L or greater, more preferably at 10 g/L or greater, and most preferably at about 50 g/L or greater.

The term "weight percent," "wt. %," "wt-%," "percent by weight," "% by weight," and variations thereof, as used herein, refer to the concentration of a substance as the weight of that substance divided by the total weight of the composition and multiplied by 100.

As used herein, the term "free of a compound" refers to a composition, mixture, or ingredient that does not contain the compound or to which the compound has not been added. Should the compound be present through contamination of a composition, mixture, or ingredients free of the compound, the amount of the compound shall be less than 0.5 wt %. More preferably, the amount of the compound is less than 0.1 wt-%, and most preferably, the amount of phosphate is less than 0.01 wt %. In this disclosure, the compound that the disclosed conductive coating composition is free of can be a surfactant, additive, or combination thereof.

As used herein, the term "an existing conductive coating composition" refers to a conductive coating composition that does not contain any functionalized carbon nanomaterial or boron nanomaterial. Such an existing conductive coating composition can contain non-functionalized carbon nanomaterial.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Further terms are defined in the detailed description.

Conductive Coating Compositions

The conductive coating compositions comprise a fluid capable of hydrogen bonding and a nanomaterial. Preferred fluids capable of hydrogen bonding, include, a fluid component capable of hydrogen bonding. The nanomaterials can be capable of hydrogen bonding or not capable of hydrogen bonding. Preferred nanomaterials are those functionalized having one or more of a first functional group capable of forming an electrostatic attraction, including, but not limited to, a hydrogen bond or boron nanomaterial; and wherein the fluid comprises one or more of a second functional group capable of forming an electrostatic attraction, including, but not limited to, a hydrogen bond with the first function group of the nanomaterial. Preferably, the conductive coating composition is stable. Preferably, the conductive coating composition is flexible. Preferably, the conductive coating material is paintable and will adhere to a surface as a coating material that does not crack. Non-limiting, exemplary conductive coating compositions are shown the Table 1.

TABLE 1

| | First Exemplary Composition (wt. %) | Second Exemplary Composition (wt. %) | Third Exemplary Composition (wt. %) |
|---|---|---|---|
| Fluid Component | 25-99.9 | 50-99.5 | 75-95 |
| Nanomaterial | 0.1-20 | 0.5-10 | 0.5-5 |
| Optional Additional Components | 0-70 | 0-47 | 0-23 |

The conductive coating compositions preferably have improved electrical conductivity and improved resistance. Preferably, the resistance is improved (lowered) over the fluid component alone by at least about 10%, 20%, 30%, 40%, 50%, 60%, 70%, 80% when measured by the same test under the same conditions. Preferably, the electrical conductivity is improved (increased) over the fluid component alone by at least about 10%, 20%, 50%, 100%, 200%, 250%, 300%, 400%, 500%, when measured by the same test under the same conditions.

The conductive coating compositions preferably have improved thermal conductivity. Preferably, the thermal conductivity is improved (increased) over the fluid component alone by at least about 10%, 20%, 30%, 40%, 50%, 60%, 70% 80%, 90% 100%, 150%, 200%, 250%, 300%, 350%, when measured by the same test under the same conditions.

The conductive coating compositions can optionally comprise one or more additional components added to provide particular properties to the coating compositions. For example, such components can include conductive particles, dyes, reflective materials, surfactants, viscosity modifiers, or combinations or mixtures thereof. Other additional components can also be added.

Fluid Component

The conductive coating compositions and methods described herein comprise a fluid component that comprises a polymer. Preferably, the polymer is a self-curing polymer. Preferably, the polymer is a thermoset polymer or a thermoplastic polymer. In some embodiments, the polymer comprises a polyacrylic acid, a methacrylate (such as poly (methyl methacrylate)), an acrylamide, a nylon, a polyethylene, a polyvinyl chloride, polyol, a polyurethane, an epoxy (preferably, a water-based epoxy), or a mixture or combination thereof. In some embodiments, the fluid component is an existing coating composition.

In a preferred embodiment, the fluid component can further comprise water, a water miscible solvent, an alcohol, or a mixture thereof. Preferred alcohols for incorporation in the fluid component include, but are not limited to, those having a carbon chain between 2 and 20 carbons. Particularly preferred alcohols, include, but are not limited to ethanol, methanol, isopropyl alcohol, and mixtures thereof. Preferred water miscible solvents include, but are not limited to, dimethylformamide, tetrahydrofuran, and mixtures thereof.

Preferably, the polymer comprises between about 1 wt. % and about 100 wt. % of the fluid component, more preferably between about 5 wt. % and about 95 wt. % of the fluid component, still more preferably between about 10 wt. % and about 90 wt. % of the fluid component, yet more preferably between about 15 wt. % and about 85 wt. % of the fluid component, even more preferably between about 20 wt. % and about 80 wt. % of the fluid component.

In some embodiments, the composition comprises from about 25 wt-% to about 99 wt-% of the fluid component. In some other embodiments, the composition comprises from about 25 wt-% to about 90 wt-%, from about 25 wt-% to about 85 wt-%, from about 25 wt-% to about 80 wt-%, from about 25 wt-% to about 75 wt-%, from about 25 wt-% to about 70 wt-%, from about 25 wt-% to about 65 wt-%, from about 25 wt-% to about 60 wt-%, from about 25 wt-% to about 55 wt-%, from about 25 wt-% to about 50 wt-%, from about 25 wt-% to about 45 wt-%, from about 25 wt-% to about 40 wt-%, from about 25 wt-% to about 35 wt-%, from about 25 wt-% to about 30 wt-%, from about 30 wt-% to about 99 wt-%, from about 35 wt-% to about 99 wt-%, from about 45 wt-% to about 99 wt-%, from about 55 wt-% to about 99 wt-%, from about 65 wt-% to about 99 wt-%, from about 75 wt-% to about 99 wt-%, from about 80 wt-% to about 99 wt-%, from about 85 wt-% to about 99 wt-%, from about 99 wt-% to about 99 wt-%, from about 25 wt-% to about 95 wt-%, from about 35 wt-% to about 95 wt-%, from about 45 wt-% to about 95 wt-%, from about 55 wt-% to about 95 wt-%, from about 65 wt-% to about 95 wt-%, from about 75 wt-% to about 95 wt-%, from about 85 wt-% to about 95 wt-%, from about 25 wt-% to about 85 wt-%, from about 35 wt-% to about 75 wt-%, from about 45 wt-% to about 65 wt-%, from about 55 wt-% to about 60 wt-%, about 25 wt-%, about 35 wt-%, about 40 wt-%, about 45 wt-%, about 55 wt-%, about 60 wt-%, about 65 wt-%, about 70 wt-%, about 75 wt-%, about 80 wt-%, about 85 wt-%, about 90 wt-%, about 95 wt-%, about 99 wt-%, or any value therebetween of the fluid component.

In another aspect, the present disclosure is a method of enhancing thermal or electric conductivity and/or resistance of a conductive coating composition, the method comprises adding into a coating composition a nanomaterial to form an improved coating composition, wherein the nanomaterial is a functionalized carbon nanomaterial having one or more of a first functional group capable of forming an electrostatic attraction, including, but not limited to, a hydrogen bond with a second functional group in the coating composition or boron nanomaterial.

In some other embodiments the method further comprising adding water or a fluid component, wherein the fluid component comprises a functional group capable of forming an electrostatic attraction, including, but not limited to, a hydrogen bond with the first functional group of the nanomaterial.

Nanomaterials

The conductive coating compositions comprise a nanomaterial. In some embodiments, the nanomaterial is capable of hydrogen bonding. In some embodiments, the nanomaterial is not capable of hydrogen bonding. In some embodiments, the nanomaterial comprises a carbon nanomaterial, boron nanomaterial, or combination thereof. In some embodiments, the nanomaterial comprises a carbon nanofiber, a single-walled carbon, multiple-walled carbon, single-walled boron, multiple-walled boron nanomaterial, or combination thereof.

Preferred nanomaterials are those functionalized having one or more of a first functional group capable of forming an electrostatic attraction, including, but not limited to, a hydrogen bond or boron nanomaterial; and wherein the fluid comprises one or more of a second functional group capable of forming an electrostatic attraction, including, but not limited to, a hydrogen bond with the first function group of the nanomaterial. Preferred nanomaterials include, but are not limited to, carbon particles and boron nanomaterials.

In some embodiments, the first and second functional group is a hydrophilic functional group. In some other embodiments, the first and second function group are independently —OH, —NH, —COOH, —F, —BH, —O—, —N—, or combination thereof. In yet some other embodiments, the first functional group is sulfonate, carboxyl, hydroxyl, amino, amide, urea, carbamate, urethane, or phosphate and the second functional group is —OH, —NH, —COOH, —F, —BH, —O—, —N—, or combination thereof. In some embodiments, the fluid component comprises at least one compound that have at least one functional group that can form an electrostatic attraction, including, but not limited to, a hydrogen bond with at least one functional group in a functionalized carbon nanomaterial or boron nanomaterial.

In some embodiments, the nanomaterial is carbon nanomaterial. In some other embodiments, the nanomaterial is carbon nanotube. In some embodiments, the nanomaterial is a single-walled, multiple-walled nanotube, or a mixture thereof. In some other embodiments, the nanomaterial is a OH functionalized carbon nanomaterial. In yet some other embodiments, the nanomaterial is a fluorine functionalized carbon nanomaterial.

In some embodiments, the nanomaterial is a OH functionalized carbon multi-walled nanotube. In some other embodiments, the nanomaterial is a fluorine functionalized carbon multi-walled nanotube. In yet some other embodiments, the nanomaterial is a OH functionalized carbon single-walled nanotube. In some other embodiments, the nanomaterial is a fluorine functionalized carbon single-walled nanotube.

In some embodiments, the nanomaterial is boron nanomaterial. In some other embodiments, the nanomaterial is a single-walled boron nanotube. In yet some other embodiments, the nanomaterial is a multiple-walled boron nanotube.

In some embodiments, the nanomaterial comprises both carbon and boron nanomaterial. In some other embodiments, wherein the nanomaterial comprises both carbon and boron nanotubes. In some other embodiments, the nanomaterial comprises single-walled carbon, multiple-walled carbon, single-walled boron, multiple-walled boron nanotube, or a combination thereof.

In some embodiments, the improved coating composition comprises from about 0.1 wt-% to about 20 wt-% of the nanomaterial, more preferably between about 0.5 wt % and about 10 wt. %, still more preferably from about 0.1 wt-% to about 5-% of the nanomaterial. In some other embodiments, wherein the composition comprises from about 0.5 wt-% to about 3 wt-% of the nanomaterial. In yet some other embodiments, the composition comprises from about 0.5 wt-% to about 2 wt-% of the nanomaterial. In some other embodiments, the composition comprises from about 0.5 wt-% to about 1.5 wt-% of the nanomaterial.

Carbon Particles and Boron Nanomaterials

The conductive coating composition and methods of making the same comprise carbon particles and/or boron nanomaterials. The carbon particles are preferably nanoparticles or nanomaterials. As used herein the reference to nanoparticles or nanomaterials (carbon or boron) includes particles or materials having at least one dimension that is less than 10,000 nanometers. Preferably, the nanoparticles and/or nanomaterials have at least one dimension that is less than 5000 nanometers, more preferably 1000 nanometers, still more preferably less than 750 nanometers, even more preferably less than 500 nanometers, and most preferably less than 250 nanometers. The terms "nanoparticle" and "nanomaterial" include, for example "nanospheres," "nanorods," "nanocups," "nanowires," "nanoclusters," "nanofibers," "nanolayers," "nanotubes," "nanocrystals," "nanobeads," "nanobelts," and "nanodisks."

The terms "carbon nanoparticle" and "carbon nanomaterial" refer to a nanoparticle or nanomaterial which contain primarily carbon element, including, but not limited to, diamond, graphite, fullerenes, carbon nanotubes, carbon fibers, and combinations thereof. Similarly, the terms "boron nanoparticle" and "boron nanomaterial" refers to a nanoparticle or nanomaterial which primarily contain boron element or boron compounds.

The term "nanotube" refers to a class of nanoparticle or nanomaterial which have a shape of a long thin cylinder and contain primarily carbon element. The term "aspect ratio" refers to a ratio of the length over the diameter of a particle. The term "SWNT" refers to a single-walled nanotube. The term "MWNT" refers to a multi-walled nanotube. The term "DWNT" refers to a double-walled nanotube. The term "F-SWNT" refers to a fluorinated SWNT.

Similarly, the term "carbon nanotube" refers to a class of carbon nanoparticle which have a shape of a long thin cylinder and contain primarily carbon element. The term "boron nanotube" refers to a class of boron nanoparticle which have a shape of a long thin cylinder and contain primarily carbon element. Both carbon and boron nanotube can be multi-wall or single walled nanotube.

Carbon nanotubes ("CNT") are nanoparticles in the shape of a long thin cylinder often with a diameter in few nanometers. The basic structural element in a carbon nanotube is a hexagon which is the same as that found in graphite. Based on the orientation of the tube axis with respect to the hexagonal lattice, a carbon nanotube can have three different configurations: armchair, zigzag, and chiral (also known as spiral). In armchair configuration, the tube axis is perpendicular to two of six carbon-carbon bonds of the hexagonal lattice. In zigzag configuration, the tube axis is parallel to two of six carbon-carbon bonds of the hexagonal lattice. Both these two configurations are achiral. In chiral configuration, the tube axis forms an angle other than 90 or 180 degrees with any of six carbon-carbon bonds of the hexagonal lattice.

Carbon nanotubes of these configurations often exhibit different physical and chemical properties. For example, an armchair nanotube is always metallic whereas a zigzag nanotube can be metallic or semi-conductive depending on the diameter of the nanotube. All three different nanotubes are expected to be very good thermal conductors along the tube axis, exhibiting a property known as "ballistic conduction," but good insulators laterally to the tube axis.

In addition to the common hexagonal structure, the cylinder of a carbon nanotube molecule can also contain other size rings, such as pentagon and heptagon. Replacement of some regular hexagons with pentagons and/or heptagons can cause cylinders to bend, twist, or change diameter, and thus lead to some interesting structures such as "Y-," "T-," and "X-junctions," and different chemical activities. Those various structural variations and configurations can be found in both SWNT and MWNT. However, the present invention is not limited by any particular configuration and structural variation. The carbon nanotube used in the present invention can be in the configuration of armchair, zigzag, chiral, or combinations thereof. The carbon nanotube can also contain structural elements other than hexagon, such as pentagon, heptagon, octagon, or combinations thereof.

Another structural variation for MWNT molecules is the arrangement of the multiple tubes. A perfect MWNT is like a stack of graphene sheets rolled up into concentric cylinders with each wall parallel to the central axis. However, the tubes can also be arranged so that an angle between the graphite basal planes and the tube axis is formed. Such MWNT is known as a stacked cone, Chevron, bamboo, ice cream cone, or piled cone structures. A stacked cone MWNT can reach a diameter of about 100 nm. In spite of these structural variations, all MWNTs are suitable for the present invention as long as they have an excellent thermal conductivity. The term MWNT used herein also includes double-walled nanotubes ("DWNT").

In some embodiments, the carbon nanotubes are single-walled nanotubes ("SWNT"), double-walled nanotubes ("DWNT"), multi-walled nanotubes ("MWNT"), or a combination of the same. In some other embodiment, the carbon nanotubes include carbon SWNT, MWNT, and/or DWNT. As used herein, the term MWNT is inclusive of DWNTs.

In some embodiments, the boron nanotubes are single-walled nanotubes ("SWNT"), double-walled nanotubes ("DWNT"), multi-walled nanotubes ("MWNT"), or a combination of the same. In some other embodiment, the boron nanotubes include boron SWNT, MWNT, and/or DWNT.

Carbon or boron nanotubes used in the present invention can also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, and W. Carbon nanotubes used in the present disclosure also include alloys of these elements such as alloys of cobalt with S, Br, Pb, Pt, Y, Cu, B, and Mg, and compounds such as the carbides (i.e. TiC, MoC, etc.) The present of these elements, alloys and compounds within the core structure of fullerenes and nanotubes can enhance the thermal conductivity of these nanotubes which then translates to a higher thermal conductive nanofluid when these nanotubes are suspend in a heat transfer fluid.

Carbon nanotubes used in the present invention can also be chemically modified and functionalized to be so-called "functionalized carbon nanotubes", such as covalently attached hydrophilic groups to increase their solubility in hydrophilic fluids or lipophilic chains to increase their solubility in hydrophobic oils. Covalent functionalization of carbon nanotubes, especially fullerenes, has commonly been accomplished by three different approaches, namely, thermally activated chemistry, electrochemical modification, and photochemical functionalization. The most common methods of thermally activated chemical functionalization are addition reactions on the sidewalls. For example, the extensive treatment of a nanotube with concentrated nitric and sulfuric acids leads to the oxidative opening of the tube caps as well as the formation of holes in the sidewalls and thus produces a nanotube decorated with carboxyl groups, which can be further modified through the creation of amide and ester bonds to generate a vast variety of functional groups.

The carbon nanotube can also be modified through addition reactions with various chemical reagents such halogens and ozone. Unlike thermally controlled modification, electrochemical modification of carbon nanotubes can be carried out in more selective and controlled manner. Interestingly, a SWNT can be selectively modified or functionalized either on the cylinder sidewall or the optional end caps. These two distinct structural moieties often display different chemical and physical characteristics. The functional group on functionalized carbon nanotubes may be attached directly to the carbon atoms of a carbon nanotubes or via chemical linkers, such as alkylene or arylene groups. To increase hydrophilicity, carbon nanotubes can be functionalized with one or more hydrophilic functional groups, such as, sulfonate, carboxyl, hydroxyl, amino, amide, urea, carbamate, urethane, and phosphate. To increase hydrophobicity, carbon nanoparticles may be functionalized with one or more hydrophobic alkyl or aryl groups. The functionalized carbon nanoparticle may have no less than about 2, no less than about 5, no less than about 10, no less than about 20, or no less than about 50 functional groups on average.

The term "carbon nanotube" or "boron nanotube" used herein refers to all structural variations and modification of SWNT and MWNT discussed hereinabove, including configurations, structural defeats and variations, tube arrangements, chemical modification and functionalization, and encapsulation.

To some extent, any carbon nanomaterial can be chemically modified or functionalized to become a "functionalized carbon nanomaterial", in a similar way for carbon nanotubes.

Carbon nanotubes are commercially available from a variety of sources. Single walled carbon nanotubes can be obtained from Carbolex (Broomall, Pa.), MER Corporation (Tucson, Ariz.), and Carbon Nanotechnologies Incorporation ("CNI", Houston, Tex.). Multi-walled carbon nanotubes can be obtained from MER Corporation (Tucson, Ariz.) and Helix material solution (Richardson, Tex.). However, the present invention is not limited by the source of carbon nanotubes. In addition, many publications are available with sufficient information to allow one to manufacture nanotubes with desired structures and properties. The most common techniques are arc discharge, laser ablation, chemical vapor deposition, and flame synthesis. In general, the chemical vapor deposition has shown the most promise in being able to produce larger quantities of nanotubes at lower cost. This is usually done by reacting a carbon containing gas, such as acetylene, ethylene, ethanol, etc., with a metal catalyst particle, such as cobalt, nickel, or ion, at temperatures above 600° C.

The selection of a particular carbon nanomaterial depends on a number of factors. The most important one is that the carbon nanomaterial is a functionalized carbon nanomaterial having one or more functional groups that are capable of forming hydrogen bond with another functional group existing in an already existing fluid component or just co-existing fluid component. Boron nanomaterial can generally form hydrogen bond with another functional group capable of forming hydrogen bond.

Another important consideration is that the nanomaterial has to be compatible with an already existing fluid component discussed thereafter. Other factors include heat transfer properties, electrical transfer properties, cost effectiveness, solubility, dispersion and settling characteristics. In some embodiments of the present disclosure, the carbon nanomaterial selected contain predominantly single-walled functionalized carbon nanotubes. In some other embodiments, the nanomaterial selected contain predominantly multi-walled functionalized carbon nanotubes. In some embodiments of the present disclosure, the carbon nanomaterial selected contain predominantly single-walled boron nanotubes. In some other embodiments, the nanomaterial selected contain predominantly multi-walled boron nanotubes.

In one aspect, the carbon nanotube has a carbon content of no less than about 60%, no less than about 80%, no less than about 90%, no less than about 95%, no less than about 98%, or no less than about 99%.

In another aspect, the carbon or boron nanotube has a diameter of from about 0.2 to about 100 nm, from about 0.4 to about 80 nm, from about 0.5 to about 60 nm, or from about 0.5 to about 50 nm. In yet another aspect, the carbon nanotube is no greater than about 200 micrometers, no greater than 100 micrometers, no greater than about 50 micrometers, or no greater than 20 micrometers in length. In yet another aspect, the carbon nanotube has an aspect ratio of not greater than 1,000,000, no greater than 100,000, no greater than 10,000, no greater than 1,000, no greater than about 500, no greater than about 200, or no greater than about 100.

Dyes

In some embodiments, the conductive coating composition can include one or more dyes or components added to impart a color. In some embodiments, the conductive coating compositions can be free of a dye. If a dye is included, it is preferably in an amount between about 0.001 wt. % and about 35 wt. %.

Reflective Material

In some embodiments, the conductive coating composition can include a reflective material. Preferred reflective materials include reflective particles. In some embodiments, the conductive coating compositions can be free of a reflective particle. If a reflective material is included, it is preferably in an amount between about 0.001 wt. % and about 25 wt. %.

Surfactants

The conductive coating composition can include a surfactant or be free of surfactant. Surfactants suitable for use with the compositions of the present invention include, but are not limited to, nonionic surfactants, anionic surfactants, and zwitterionic surfactants. In some embodiments, the compositions of the present invention include about 0.001 wt % to about 30 wt. % of a surfactant. In other embodiments the compositions of the present invention include about 0.1 wt. % to about 25 wt. % of a surfactant. In still yet other embodiments, the compositions of the present invention include between about 1 wt. % and about 15 wt. % of a surfactant.

Viscosity Modifiers

The conductive coating composition can optionally comprise a viscosity modifier. Preferred viscosity modifiers include thickeners or thinners.

Methods of Preparing the Conductive Coating Compositions

The conductive coating compositions can be prepared with a variety of equipment and under conditions specific to the ingredients for the particular conductive coating composition. For example, the method may include heating the fluid, such that carbon particles and/or boron nanomaterials can be dispersed therein. The precise temperature of the heating may be dictated by the melting point or boiling point of the fluid.

The conductive coating compositions can be prepared in batch or continuous processes. To prepare the conductive coating compositions, the fluid can be heated. In some embodiments the fluid component is heated; in some embodiments the fluid component is not heated. Whether the fluid component is heated can depend on the type of polymer included in the fluid component. For example, a polymer such as a thermoset may cure upon heating. The temperature of heating may vary based on the fluid component and species of polymer in the fluid component. In an embodiment, where the fluid component is heated, it is preferably heated to a temperature between about 20° C. and about 100° C., more preferably a temperature between about 23° C. and about 90° C. In some embodiments, heating is not necessary.

After heating the fluid component, carbon particles and/or boron nanomaterials can be added to the fluid component. The carbon particles and/or boron nanomaterials can be added all at once or sequentially in smaller portions. Preferably, the carbon particles and/or boron nanomaterials are mixed or stirred in the fluid to form a conductive coating composition. If the carbon particles and/or boron nanomaterials are added sequentially in small portions, the mixing and/or stirring can be performed as the nanotubes are being added and/or between sequential additions. Preferred mixing and stirring methods, include, but are not limited to, automatic mixers (such as paddle mixers), stir bars, manual stirring or manual mixing, sonication, etc. The intensity and speed of the mixing or stirring can vary. Preferably, the intensity and/or speed are not too vigorous so as to break or degrade the carbon particle and/or boron nanomaterial structures. The stirring can occur for any amount of time sufficient to disperse the carbon particles and/or boron nanomaterials. Preferably, the carbon particles and/or boron nanomaterials are thoroughly dispersed; most preferably, the carbon particles and/or boron nanomaterials are homogenously dispersed in the fluid. Preferred mixing and/or stirring times can be between about 1 minute and 2 hours; more preferably, between about 2 minutes and about 1 hour; most preferably between 5 minutes and 30 minutes. In an embodiment where the preparation of the conductive coating compositions is a continuous process, the mixing may be continuous.

After mixing, the conductive coating composition can optionally be heated, cooled, or maintained at the same temperature. If the conductive coating composition is heated, it is preferably heated to a temperature between about 20° C. and about 100° C., more preferably to a temperature between about 230° C. and about 90° C. The heating can be performed for a time between about 1 minute and about 2 hours; more preferably between about 5 minutes and about 90 minutes; most preferably between about 10 minutes and about 1 hour.

Preferably the conductive coating composition is passed through a roller mill, an extruder, a manual or mechanical stirrer. Preferably, the conductive coating composition is passed through a roller mill. Preferred roller mills, include, but are not limited to, two-roll mills and three-roll mills. Preferably the conductive coating composition is passed through a roller mill a sufficient number of times to obtain a smooth consistency. In a preferred method, the conductive coating composition is passed through a roller mill between 1 and 20 times, more preferably between 2 and 15 times, most preferably between 3 and 10 times. The conductive coating composition can be passed through the same roller mill multiple times or through a series of roller mills to achieve the desired number of pass-throughs.

After passing the conductive coating composition through a roller mill, the conductive coating composition can be heated, cooled, or maintained at the same temperature. The conductive coating composition can then be applied to a surface. Suitable methods of applying the conductive coating material to surface include, but are not limited to, painting, printing, spraying, manual application methods, automated or machine application methods, or a combination thereof. Preferred printing methods, include, but are not limited to 3D printing, inkjet printing, and Sonitek® printing.

After the conductive coating compositions are applied to a surface, the conductive coating compositions can be cured. Preferred methods of curing include, self-curing, UV curing, thermal curing (e.g., heating), free radical curing, or a combination thereof.

While an understanding of the mechanism is not necessary to practice the present invention and while the present invention is not limited to any particular mechanism of action, it is contemplated that the combination of a fluid and nanomaterial that can form an electrostatic attraction, including, but not limited to, a hydrogen bond among them leads to enhanced thermal and electrical conductivity. Because of this combination, the disclosed coating compositions herein possess an enhanced thermal and/or electrical conductivity. The disclosed coating compositions are also more stable even under tough conditions.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

In this Example, a series of flexible nanocoating compositions were prepared and some electrical and/or thermal properties were measured. An exemplary procedure for making the flexible nanocoating compositions follows. The exemplary compositions were prepared according to this exemplary method. The fluid component was heated to increase the viscosity and facilitate better mixing of the materials. Carbon nanomaterials were slowly added to the fluid component while stirring. Once all carbon nanotubes were added, the mixture was stirred for 10 more minutes. The mixture was allowed to cool down while stirring until it is safe to handle. The mixture was passed through a three-roll mill eight times to obtain a smooth consistency.

Table 2 lists the ingredients and the measured resistances. The resistivity was measured with a Keithly instrument 2401. The accurate resistivity was measured with a four probe meter. The thermal conductivity data was obtained using the Hot Disk™ thermal constants analyzer, using the following parameters:

| | |
|---|---|
| measurement depth: | 6 mm |
| room temperature: | 25° C. |
| power: | 0.025 W |
| measurement time: | 16 seconds |
| sensor radius: | 2.001 mm |
| TCR: | 0.0471/K, |
| disk type: | Kapton |
| temperature drift rec: | yes |

The stability of the coating compositions was assessed visually. If unstable the components would separate. This was not observed for any of the exemplary samples prepared and examined. All of the coatings were stable and maintained conductivity over several months.

TABLE 2

The ingredients and measured resistance of some exemplary coatings.

| Fluid Component | Carbon | Carbon wt. % | Resistivity (ohm) | Accurate Resistivity (Ω · m) | Thermal Conductivity $(W/mK)_{cured}$ |
|---|---|---|---|---|---|
| Polyurethane | MWNT-OH | 7.5 | | (#50) 400 | |
| Polyurethane | MWNT-OH | 5 | | (#51) 6000 | |
| Polyacrylic | MWNT-OH | 5 | $1.6 \times 10^4$ | | |
| Polyurethane | MWNT-OH | 2 | $8.9 \times 10^4$ | | |
| Polyurethane 75 wt. %/ 25 wt. % $H_2O$ | MWNT-OH | 4.5 | $1.3 \times 10^2$ | (#57) | |
| Polyurethane diluted w/$H_2O$ | MWNT-OH | 7.5 | $1.3 \times 10^2$ | | |
| Polyurethane (9.25 g grease diluted w/4 g $H_2O$) | MWNT-OH | 7.5 | $5.7 \times 10^2$ | | |
| Polyurethane | MWNT-OH | 4.5 | $5.8 \times 10^3$ | | |
| 75 wt. % Polyacrylic/ 25 wt. % $H_2O$ | MWNT-OH | 4.5 | $1.2 \times 10^{\times 3}$ | | |
| 75 wt. % Polyurethane/ 25 wt. % IPA | MWNT-OH | 4.5 | $4.8 \times 10^2$ | (#55) 25 | |
| 75 wt. % Polyurethane/ 25 wt. % EtOH | MWNT-OH | 4.5 | $2.1 \times 10^2$ | (#56) 6.8 | |

TABLE 2-continued

The ingredients and measured resistance of some exemplary coatings.

| Fluid Component | Carbon | Carbon wt. % | Resistivity (ohm) | Accurate Resistivity (Ω · m) | Thermal Conductivity $(W/mK)_{cured}$ |
|---|---|---|---|---|---|
| A + B Water Based Epoxy | MWNT-OH | 5 | $5.8 \times 10^{\times 3}$ | | |
| Thick to Diluted Polyurethane | MWNT-OH | N/A | | (#54) 23.2 | |
| Polyurethane | CNF-19 | 10 | $3.4 \times 10^{\times 1}$ | | 1.578 |
| 50 wt. % Polyurethane/ 50 wt. % $H_2O$ | CNF-19 | 10 | $1 \times 10^{\times 1}$ | | 1.254 |

As shown in Table 2, many of the coating compositions provided excellent resistivity properties. These results demonstrate that the coating compositions described herein could be useful as conductive coating materials.

Example 2

An exemplary coating composition was prepared and painted onto a surface to assess its paintability and its ability to serve as a surface coating. The compositions comprised 25 wt. % ethanol and 75 wt. % Polyurethane as the fluid component and had 4.5 wt. % of MWNT-OH carbon nanomaterials. The properties of this composition are reflected in Table 2. The photograph of the coating painted onto the surface can be seen in FIGS. 1A and 1B.

Figure 1B:
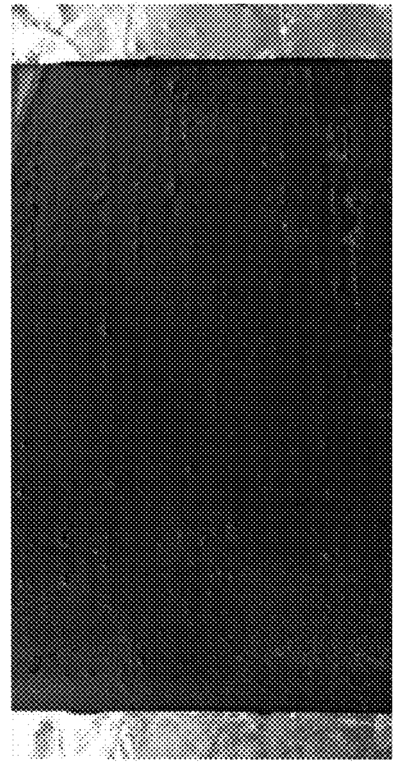
FIG. 1B is a photograph of an exemplary conductive flexible coating composition comprising carbon nanomaterial and providing enhanced conductor/semiconductor properties on a surface.

As can be seen in FIGS. 1A and 1B, the coating composition was capable of painting on a surface. It covered the surface and dried without cracking or peeling from the surface. Inspection of the composition on the surface revealed its suitability to serve as a coating material.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture the disclosed compositions and methods. Since many embodiments can be made without departing from the spirit and scope of the invention, the invention resides in the claims.

What is claimed is:

1. A conductive coating composition comprising:

from about 25 wt-% to about 99 wt-% of a fluid component comprising a polymer; wherein the polymer is a self-curing polymer, a thermoset polymer, or a thermoplastic polymer; wherein the polymer comprises polyacrylic acid, polyurethane, epoxy, or a mixture thereof; and wherein the fluid component comprises one or more of a second functional group capable of forming a hydrogen bond; and from about 0.5 wt-% to about 20 wt-% of a nanomaterial; wherein the nanomaterial comprises a carbon nanomaterial having one or more of a first functional group capable of forming a hydrogen bond, and wherein the nanomaterial comprises a boron nanomaterial;

wherein the nanomaterial is dispersed within the fluid component;

wherein the first functional group and the second functional group form an electrostatic attraction; and wherein the conductive coating composition is paintable and forms a coating that does not crack upon drying.

2. The composition of claim 1, wherein the first and second functional group is a hydrophilic functional group.

3. The composition of claim 2, wherein the first functional group is an —OH, —NH, —COOH, —F, —BH, —O—, —N—, or combination thereof.

4. The composition of claim 2, wherein the second functional group is an —OH, —NH, —COOH, —F, —BH, —O—, —N—, or combination thereof.

5. The composition of claim 1, wherein the carbon nanomaterial is carbon nanotube, carbon nanofiber, graphite particle, graphene particle, or combination thereof having at least one dimension that is less than 10,000 nanometers.

6. The composition of claim 1, wherein the nanomaterial further comprises an OH functionalized carbon nanomaterial, a fluorine functionalized carbon nanomaterial, or a combination thereof.

7. The composition of claim 1, wherein the nanomaterial comprises single-walled carbon, multiple-walled carbon, single-walled boron, multiple-walled boron nanotube, or a combination thereof.

8. The composition of claim 1, wherein the fluid component comprises a polyacrylic acid, methacrylic acid, acrylamide, a polyurethane, an epoxy, a nylon, a polyvinyl chloride, or combination thereof.

9. The composition of claim 8, wherein the fluid component further comprises water, a polyol, a polyethylene, a water miscible solvent, or a mixture thereof.

10. The composition of claim 1, wherein the composition further comprises a dye, a reflective material, a viscosity modifier, or mixture thereof.

11. The composition of claim 1, wherein the composition's resistance is lower than the fluid component by at least about 10% when measured under the same conditions;

and/or wherein, the composition has improved thermal conductivity than the fluid component by at least about 10% when measured by the same test under the same conditions.

12. A method of preparing the composition of claim 1 comprising:

(a) combining the fluid and the nanomaterial;

(b) mixing the fluid and nanomaterial to form a coating composition; and (c) passing the coating composition through a roller mill, an extruder, a manual stirrer, and/or a mechanical stirrer to form the conductive coating composition.

13. The method of claim 12, wherein the fluid is heated prior to, during, and/or after step (a).

14. The method of claim 12, wherein the fluid is not heated before or during mixing.

15. The method of claim 12, wherein the coating composition is heated during and/or after step (b).

* * * * *